United States Patent
Korda

(10) Patent No.: US 10,514,949 B1
(45) Date of Patent: Dec. 24, 2019

(54) EFFICIENT DATA PROCESSING IN A SERVERLESS ENVIRONMENT

(71) Applicant: Signal Analytics Ltd, Netanya (IL)

(72) Inventor: Nahum Korda, Ramat Ha-Golan (IL)

(73) Assignee: SIGNALS ANALYTICS LTD., Netanya (IL)

( * ) Notice: Subject to any disclaimer, the term of this patent is extended or adjusted under 35 U.S.C. 154(b) by 0 days.

(21) Appl. No.: 16/215,694

(22) Filed: Dec. 11, 2018

(51) Int. Cl.
G06F 9/46 (2006.01)
G06F 9/48 (2006.01)

(52) U.S. Cl.
CPC .......... *G06F 9/4831* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 5,615,379 A | 3/1997 | Ho | |
| 8,271,437 B2 | 9/2012 | Arcese et al. | |
| 2004/0139426 A1* | 7/2004 | Wu | G06N 5/022 717/120 |
| 2005/0149935 A1* | 7/2005 | Benedetti | G06F 9/50 718/102 |
| 2007/0233690 A1* | 10/2007 | Bruchlos | G06Q 30/02 |
| 2012/0158843 A1* | 6/2012 | Angani | G06Q 30/02 709/204 |
| 2017/0286143 A1* | 10/2017 | Wagner | G06F 9/45558 |
| 2018/0075163 A1* | 3/2018 | Park | G06F 8/35 |

FOREIGN PATENT DOCUMENTS

| | | |
|---|---|---|
| CN | 102110021 | 4/2013 |
| CN | 103605567 | 3/2017 |
| CN | 107168799 | 9/2017 |
| CN | 107203412 | 9/2017 |

(Continued)

OTHER PUBLICATIONS

Totoy et al., An Extensible Scheduler for the OpenLambda FaaS Platform, ACM, Match 2018, 4 pages.*

(Continued)

*Primary Examiner* — Diem K Cao
(74) *Attorney, Agent, or Firm* — Naomi S. Rosenman-Helfand

(57) ABSTRACT

A method, system and computer program product, the method comprising: initiating a first task executor configured to: initiating a first task executor; determining whether sufficient resources are available for performing a task; detecting whether there are data items from a batch upon which the task is to be executed, wherein the data items are not being handled and not processed; subject to detecting the data items, and determining sufficient resources are available, initiating a second task executor configured as the first; selecting a data item; marking the data item as being handled; processing the data item comprising calling an external function for processing, wherein usage of the external function is priced by a number of calls; and terminating upon any one of the following: receiving an indication that the external function has completed or failed; a predetermined time passed since the data item was transmitted; or multiple task executors exist.

14 Claims, 4 Drawing Sheets

(56) References Cited

FOREIGN PATENT DOCUMENTS

GB        2492352        1/2013

OTHER PUBLICATIONS

Aqdori et al, A Spawn Mobile Agent Itinerary Planning Approach for Energy-Efficient Data Gathering in Wireless Sensor Networks, MPDI, Jun. 2017, 16 pages.*
Jiang et al, Serverless Execution of Scientific Workflows, The University of Sydney, Oct. 2017, 17 pages.*
SARL, Parallel execution within the agents, Sep. 2018, 5 pages.*
Govindarajan et al., Task Scheduling in Big Data—Review, Research Challenges, and Prospects, Indiana University, Aug. 2018, 8 pages.*
Baldini et al., Serverless Computing: Current Trends and Open Problems, Jun. 2017, 20 pages.*
Authors: Chase Qishi Wu ; Xiangyu Lin ; Dantong Yu ; Wei Xu ; Li Li Title: End-to-End Delay Minimization for Scientific Workflows in Clouds under Budget Constraint IEEE Transactions on Cloud Computing, Date: Sep. 15, 2014, pp. 169-181, vol. 3 , Issue: 2, Apr.-Jun. 1, 2015; Publisher: IEEE; Retrive from the Internet: https://ieeexplore.ieee.org/document/8171368.
Authors: Khaled Almi'Ani ; Young Choon Lee ; Bernard Mans Title: Resource demand aware scheduling for workflows in clouds2017 IEEE 16th International Symposium on Network Computing and Applications (NCA); Date of Conference: Oct. 30-Nov. 1, 2017, Date Added to IEEE Xplore: Dec. 11, 2017; Publisher: IEEE; Conference Location: Cambridge, MA, USA; Retrived from the Internet: https://ieeexplore.ieee.org/document/8171368.
Authors: Young Choon Lee ; Albert Y. Zomaya Title: An Artificial Immune System for Heterogeneous Multiprocessor Scheduling with Task Duplication 2007 IEEE International Parallel and Distributed Processing Symposium; Date of Conference: Mar. 26-30, 2007, Date Added to IEEE Xplore: Jun. 11, 2007; Publisher: IEEE; Conference Location: Rome, Italy; Retrived from the Internet: https://ieeexplore.ieee.org/document/4228157.

* cited by examiner

EFFICIENT DATA PROCESSING IN A SERVERLESS ENVIRONMENT

TECHNICAL FIELD

The disclosure relates to efficient data processing in general, and to efficient task scheduling in serverless computing, in particular.

BACKGROUND

Batch processing of large data volumes raises the need for highly efficient processing parallelization. In data pipeline processing, where the output of one stage is the input to the next one, processing parallelization relates to two main aspects: data parallelization, wherein a single task is executed in parallel on multiple data items, and task parallelization, where multiple tasks are executed in parallel on the same data, or on derivatives of the data obtained by preceding processing stages.

Prior art solutions rely on hardware-intensive computing, such as mainframe computers or commodity clusters. Such solutions are difficult to setup and manage, generally expensive, and inflexible, as the infrastructure needs to be owned and maintained even at times when low or no processing requirements exist.

A practical solution is offered by cloud computing in the form of utility computing. The "function as a service" (FaaS) paradigm is a cloud-based computing service that allows customers to develop, run, and manage application functionalities without the burden of building and maintaining the infrastructure. In such "serverless" paradigm the cloud provider acts as the server, dynamically managing the allocation of machine resources. Accordingly, pricing is based on the actual amount of resources consumed by an application, rather than on pre-purchased units of capacity.

However, the FaaS paradigm introduces requirements for scheduling tasks and in particular tasks associated with batch processing, and operation under various constraints. The requirements and constraint may relate to enhancing some or all the following factors and possibly additional ones: the efficiency, the makespan, i.e. the time from the beginning of the batch until all data is processed, the cost, fault tolerance, rapid recovery in cases of failure without having to repeat significant parts of the job, data throughput due to the database and network limitations, or the like.

BRIEF SUMMARY

One exemplary embodiment of the disclosed subject matter is a computer-implemented method for: receiving a batch to be processed, the batch comprising a multiplicity of data blocks; and scheduling initiation of a multiplicity of task executors configured to call at least one Function as a Service (FaaS) for processing a data block from the data blocks, wherein the FaaS is charged by a number of calls, wherein the FaaS is constrained by a maximal number of concurrent calls, and wherein the multiplicity of task executors are initiated to maximize an actual number of concurrent calls, thereby reducing a makespan of the batch.

Another exemplary embodiment of the disclosed subject matter is a computer-implemented method for: initiating a first task executor; determining by the first task executor whether sufficient resources are available for performing a task; detecting by the first task executor whether there are data items from a batch upon which the task is to be executed, wherein the data items are not being handled and not processed; subject to the first task executor detecting the data items, and determining that sufficient resources are available, initiating a second task executor configured as the first task executor; selecting a data item from the data items; marking the data item as being handled; processing the data item comprising calling an external function for processing, wherein usage of the external function is priced by a number of calls; and terminating upon any one of the following: receiving an indication that processing by the external function is completed, and marking the data item as processed; receiving an indication that processing by the external function failed, and marking the data item as not handled and not processed; a predetermined time having passed since the data item was transmitted to the external function and marking the data item as not being handled and not processed; or more than one task executor exists. Within the method, marking the data item as being handled optionally expires subject to not being changed within a predetermined time, thereby making the data item available for processing. Within the method, the external function is optionally executed by an external computing device. Within the method, selecting the data item from the at least one data item is performed in accordance with a combination of priority and importance assigned to each data item of the at least one data item. Within the method, selecting the data item from the data items optionally comprises performing a round robin scheduling among the at least one data item. Within the method, marking the data item optionally comprises storing marks or states with the data item.

Yet another exemplary embodiment of the disclosed subject matter is a system having a processor, the processor being adapted to perform the steps of: initiating a first task executor; determining by the first task executor whether sufficient resources are available for performing a task; detecting by the first task executor whether there are data items from a batch upon which the task is to be executed, wherein the data items are not being handled and not processed; subject to the first task executor detecting the data items, and determining that sufficient resources are available, initiating a second task executor configured as the first task executor; selecting a data item from the data items; marking the data item as being handled; processing the data item comprising calling an external function for processing, wherein usage of the external function is priced by a number of calls; and terminating upon any one of the following: receiving an indication that processing by the external function is completed, and marking the data item as processed; receiving an indication that processing by the external function failed, and marking the data item as not handled and not processed; a predetermined time having passed since the data item was transmitted to the external function and marking the data item as not being handled and not processed; or more than one task executor exists. Within the system, marking the data item as being handled optionally expires subject to not being changed within a predetermined time, thereby making the data item available for processing. Within the system, the external function is optionally executed by an external computing device. Within the system, selecting the data item from the data items is optionally performed in accordance with a combination of priority and importance assigned to each data item of the at least one data item. Within the system, selecting the data item from the data items optionally comprises performing a round robin scheduling among the data items. Within the system, marking the data item optionally comprises storing marks or states with the data item.

Yet another exemplary embodiment of the disclosed subject matter is a computer program product comprising a non-transitory computer readable storage medium retaining program instructions configured to cause a processor to perform actions, which program instructions implement: initiating a first task executor; determining by the first task executor whether sufficient resources are available for performing a task; detecting by the first task executor whether there are data items from a batch upon which the task is to be executed, wherein the data items are not being handled and not processed; subject to the first task executor detecting the data items, and determining that sufficient resources are available, initiating a second task executor configured as the first task executor; selecting a data item from the data items; marking the data item as being handled; processing the data item comprising calling an external function for processing, wherein usage of the external function is priced by a number of calls; and terminating upon any one of the following: receiving an indication that processing by the external function is completed, and marking the data item as processed; receiving an indication that processing by the external function failed, and marking the data item as not handled and not processed; a predetermined time having passed since the data item was transmitted to the external function and marking the data item as not being handled and not processed; or more than one task executor exists.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
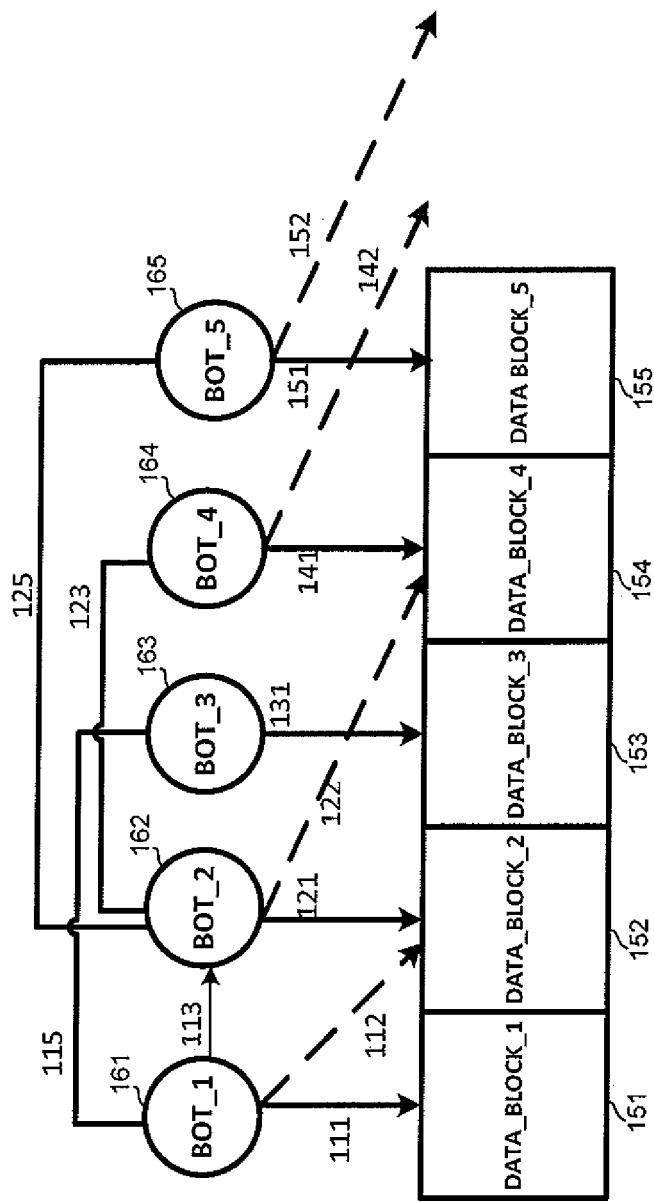
FIG. 1 is an illustrative example of data processing in a serverless environment, in accordance with some embodiments of the disclosure.

An important type of assignments of computer systems refers to execution of multiple batch jobs, where each batch job consists of multiple tasks and wherein at least some of the tasks are performed serially, i.e. the output of one task is the input to the next. The batch jobs may be typically abstracted as directed, acyclic graphs (DAG). Two or more batch jobs may use identical tasks, but possibly in different order. Some batch jobs can share some tasks and differ in others.

The "function as a service" (FaaS) paradigm is a cloud-based computing service that allows customers to develop, run, and manage application functionalities without the burden of building and maintaining the infrastructure. In this "serverless" paradigm, the cloud provider acts as the server, and manages dynamically the allocation of machine resources. Pricing is generally based on the actual amount of resources consumed by an application, rather than on pre-purchased units of capacity.

Therefore, when using FaaS, while the allocation of the processing resources is intrinsically provided by the FaaS platform, a user needs to schedule the tasks and use the services in a manner that will make good use of the resources, including time and cost, for achieving the user goals.

The term "data item" used in this specification should be expansively construed to cover any type of data in a digital format, which need to undergo processing, and is stored in volatile or persistent memory.

The term "data item" used in this specification should be expansively construed to cover any type of data item collections, wherein each data items need to go one or more processing steps.

The term "task executor" used in this specification should be expansively construed to cover any type of software configured for performing processing on a data item, including calling a FaaS. The term "multiplicity of task executors" relates to the existence of more than one task executor configured for performing the same processing on data items.

The term "external function" used in this specification should be expansively construed to cover any type of processing performed by a unit other than the calling task executor, whether on the same or on a different computing platform, such as a FaaS.

The term "makespan" used in this specification should be expansively construed to cover the distance in time that elapses from the start of a job work to its end.

Thus, one technical problem dealt with by the disclosed subject matter relates to scheduling tasks that use services, and in particular cloud-based FaaS services. The tasks should be scheduled so as to provide efficient data flow to and from the processing functions, and in the case of a pipeline, also between the functions performing different tasks in the pipeline.

Another technical problem dealt with by the disclosed subject matter relates to scheduling the FaaS such that it operates in a manner that balances one or more constraints and achieves one or more goals as detailed below. It will be appreciated that the distinction between constraints and goals is not always absolute and they may sometime be interchangeable.

Typical scheduling constraints may include but are not limited to any one or more of the following: bandwidth, also referred to as data throughput limitations due to database and/or network limitations; processing resources; and the maximal number of concurrent calls to the FaaS, which is generally related to the cost. Thus, a FaaS task scheduler has to balance the data throughput constraint with other constraints, in order to keep the concurrent calls at the maximum and thus minimize the makespan.

Typical user goals or requirements may include minimizing the makespan, i.e. the time until since the process begins until all data has gone through all processing steps, while utilizing the available resources as much as possible, thus reducing the total cost.

The makespan is typically constrained, i.e., cannot be infinitely reduced, by the maximum allowed number of concurrent calls to a single function, allowed by the FaaS provider, which in turn may be a function of cost. Ideally the task scheduling should keep the data flow and the concurrent calls at the maximum, in order to achieve the shortest possible makespan. However, multiple batch jobs that use the same functions, e.g. they reach the same FaaS functions at the same time the, can be, and typically are executed synchronously. In such case the task scheduler must ensure that competition between multiple batch jobs for the same function is avoided or reduced, and that these jobs are instead executed in a lockstep. When executed in a lockstep, the jobs can maximize the number of calls, because each job calls a different function.

Batch jobs may be typically abstracted as directed, acyclic graphs (DAG). If the makespan of the batch jobs needs to be minimized under a given cost, it may be required to calculate the most optimal sequence in which they must be executed, in order to avoid scheduling conflicts. However, such calculation may require complex algorithms, as well as statistical estimates of task durations and the data volume. These statistical estimates are further complicated by the fact that the execution time of any task can vary significantly with the size and the quality of the input data, other tasks or executed programs, or the like. Therefore, a centralized scheduling mechanism that would attempt to calculate critical paths based on the statistical estimates can be problematic to design and implement. Additionally, a solution based on DAGs may also not maximize the FaaS utilization, and may thus incur high and avoidable cost of the FaaS services.

Yet another technical problem dealt with by the disclosed subject matter relates to the FaaS scheduler having to tolerate faults. First, faults of the local processing and of the task scheduling need to be handled, such that if any of the tasks fails, or the scheduling process fails, as little processing as possible needs to be repeated, and rapid recovery is enabled. Task scheduling is traditionally performed by a single component. Such single point of failure can practically incapacitate the entire system, regardless of how fault tolerant the system otherwise is. Therefore, FaaS task scheduling mechanisms need to avoid this design involving a single point of failure.

Another type of faults to be tolerated includes FaaS exceptions. FaaS exceptions can either originate in the FaaS platform, due for example to infrastructure problems such as timeouts, network failures, queue rejections or the like; or in the function code, for example out of memory exception, invalid input data, bugs, or the like. For every such error, the task scheduler has to determine whether the call should be retried or abandoned.

Yet another technical problem dealt with by the disclosed subject matter relates to recovering from failures to the same, or almost the same state within the processing pipeline where the failure occurred, so that the processing can be seamlessly continued after recovery, without repeating substantial amount of work.

One technical solution of the disclosed subject matter relates to a task scheduler that improve the usage of FaaS systems. The solution relates to a multi-agent system for handling pipeline comprising a multiplicity of processing tasks on a batch job comprising a multiplicity of data blocks, in which the output of performing one task on a data block becomes the input of the next task in the pipeline. Each agent, also referred to as "bot", of the multiple agents is responsible for the execution of one data processing task on one block of data, and the system is responsible for synchronous batch processing of multiple blocks of data.

Each bot, after being initiated, determines whether there exists and then selects a data block that needs the type of processing the bot is configured to perform, and if one exists, the bot may select it. The bot may mark or lock the data block as being processed, such that other bots will not attempt to process or mark it. It will be appreciated that the terms "mark" and "lock" are used interchangeably in the description below, as locking may rely on a marking implementation. It will also be appreciated that the locks and processing states are embedded within the data and not on storage external thereto. The bot may also determine whether there are additional data blocks waiting to be processed. If there are additional data blocks and sufficient available resources, the bot initiates up to a predetermined number of additional bots, for example one bot, two bots, or the like, and the newly created bots start executing, too, in the same manner as the creating bot. The required resources may include the number of available FaaS connections, processing resources of the computing platform on which the bot is initiated, or the like.

A pipeline stage is associated with a corresponding FaaS function, and a corresponding bot type, and every bot is configured to execute the relevant FaaS function. Therefore, each bot processes the data block it locked, including calling the FaaS service it is configured to call, and which is required for the particular processing stage of the data block.

Thus, the bots are not created by a central unit, rather each bot creates additional ones in accordance with the needs and resources, thus avoiding a possible single point of failure. Further, the data blocks are not allocated to the bots by a central unit, rather each bot independently pulls data from a data source. The order by which bots pull data may be determined in a multiplicity of manners, for example random, in accordance with a priority weight, or the like. The priority weight may be calculated according to a timestamp specified as the desired start or end date of the batch processing and/or the degree of urgency, such that data with higher priority may be pulled and processed first. The date(s) and urgency may be set by a human operator.

A bot may terminate and release the computing resources it consumes upon any of the following conditions:

As soon as it is created if the availability of resources changed during its creation, such that the available resources are no longer sufficient to successfully perform the processing task;

The FaaS processing was completed successfully;

The FaaS processing was not completed and raised an exception; or

The FaaS processing time did not complete and return within a predetermined threshold.

However, the bot will not terminate if it is the last remaining bot of its type. The number of bots may be stored together with the data blocks on a data source. If the bot is the last remaining bot of its type, the bot may change its operation mode, and may remain alive, and keep checking for data to process, and for additional data to be processed by other bots. If such additional data is found the bot will spawn additional bots. The bot may then resume the regular operation mode. Thus, no single dedicated component controls the termination of the bots, but rather each bot controls when to terminate itself.

Upon successful completion of the processing, a bot may mark the block data it fetched as handled, so that other bots will not be spawned for handling it. The mark, as well as processing results, may be stored with the data block.

In other situations, for example if an error is raised by the FaaS server, or a timeout occurs, the bot may mark the data as not handled and not being processed, such that other bots may attempt to handle it. However, if the block was not marked as handled, then even if the processing of a locked data block fails in such way that the executing bot cannot unlock that data block, the lock will still expire automatically after a period of time, making that data block available for processing by another bot.

In some embodiments, when an error is received from an FaaS function, the calling bot may determine whether to reject the data block, or allow another bot to retry processing it. The decision may depend on the error type. If the data block needs to be reprocessed, another bot will spontaneously pull it from the data source. If flagged as rejected, the block of data will not be pulled again by any bot. In some embodiments, a maximal number of processing attempts may be allocated for each data block, and different marks may be used for different attempt cycles. If the maximal number of attempts have failed, the data block may be marked as abandoned and no other bot will attempt to process the data block.

One technical effect of the disclosed subject matter is the provisioning of a method and system for using FaaS in a cost effective way, by scheduling the calls to the FaaS.

Another technical effect of the disclosed subject matter is that every task is executed on every data block by exactly one bot, wherein multiple tasks are executed synchronously, and a bot terminates upon the completion of the task execution, thus releasing the computing resources to the system.

Yet another technical effect of the disclosed subject matter is that the number of bots scales up and down in accordance with the quantity of the processing tasks. As the number of agents is allowed to spontaneously fluctuate according to the amount of tasks that need to be executed and the availability of the processing resources, this solution may be adequate for projects in which during incubation or fading periods, when little or no data is available for processing, the number of agents may be as low as one, while during normal working periods the number of agents may rise to hundreds or even thousands. The number of bots does not rely on any estimates or calculations of the tasks, but is rather spontaneously updated as the situation evolves.

Thus, the quantity of the processing tasks is not predefined, but is rather flexible and self-adaptive, and there are no idle or inactive bots at any point in time, excluding the single last bot remaining when no data blocks are to be processed. No bot multiplication takes place when all processing data is exhausted, and no idle time needs to be optimized.

Yet another technical effect of the disclosed subject matter is that the changing number of bots may use the maximal number of FaaS requests that can be active concurrently, thus providing for minimizing the makespan. Usage of the maximal number of FaaS functions also provides for lockstep execution of the batch. Further, the self-replicating bots control the parallelization of FaaS calls, rather than a dedicated component, thus eliminating a single point of failure.

Yet another technical effect of the disclosed subject matter is that the number of bots at any point in time is in accordance with the available computing resources, including for example the available memory, available CPU capacity, available bandwidth throughput, or the like, which may change in accordance with the number of processing tasks executed synchronously, the operating system activities, other programs, hardware conditions, the physical environment, etc. The system thus dynamically self-adapts to ensure maximum processing under the changing resource availability.

Yet another technical effect of the disclosed subject matter is that it provides for optimizing and making cost-effective usage of the FaaS services by a calling scheduler external to the FaaS server, rather than an internal FaaS scheduler that distributes requests among platform resources.

Yet another technical effect of the disclosed subject matter is that since each bot marks, and thus locks the data block it processes, double processing is eliminated. Since FaaS services are charged per request, the locks ensure that the minimal number of FaaS requests is initiated to complete processing which provides for cost reduction or optimal use of the paid price.

Yet another technical effect of the disclosed subject matter is that since the marking, e.g., the locks, and/or processing results are saved with each data block, the lock management is built-in within the system and not external. Further, in pipeline processing situations, the processing state and optionally processing results may be stored with the data block, rather than externally. Thus, at every point in time the status and the output of the last processing task, which is also the input for the next processing task, is maintained with the data block in the system. Storing the status and the results provides for utilizing partial processing without having to restart or repeat processing if any of the processing failed.

Yet another technical effect of the disclosed subject matter is that the weights associated with the data blocks may ensure that scheduling conflicts and competitions are resolved by processing the higher priority data first, and by delaying processing of lower priority data. This resolution is achieved spontaneously when a conflict occurs, and does not need to be planned for and calculated in advance. This resolution also spontaneously creates lockstep execution, where higher priority data continues to be processed by a next pipeline stage, while lower priority data is still being processed by a previous stage. In some situations the lockstep execution may also provide for minimizing the makespan, for example when the conflicts cause delays, due for example to rejected calls to FaaS and delayed retrials of queued tasks. However, as detailed below, lockstep execution in accordance with the priorities, will reduce the total cost. The lockstep continues until all data blocks are processed. However, if processing higher priority data takes longer than processing lower priority data, processing the lower priority data may be delayed until the higher priority data has finished processing, and form that time will continue in lockstep, unless the same situation occurs for further tasks. In this case, the situation may be resolved in the same manner, by waiting again for the higher priority task to complete. This delay of the lower priority tasks will always occur, in order to minimize the cost as defined below.

Yet another technical effect of the disclosed subject matter is that the decentralization of task allocation guarantees high fault tolerance. It is sufficient that a single bot of any type survives, in order to spontaneously regrow the entire system to a size required by the amount of data blocks to be processed. Moreover, multiple systems can execute on completely detached machines, ensuring that if any machine fails the processing can still proceed if one machine is still functional. In addition to the self-replicating bots eliminating a single point of failure, in case of a total failure it is sufficient to restart the system as is, in order to continue processing from the point in the pipelines at which the failure occurred. There is no need to recover or reconstruct bookkeeping data or repeat processing.

Yet another technical effect of the disclosed subject matter relates to the decentralized nature of the system, which increases its scalability both within a single computing platform and in a multi-platform environment, derived from the low overhead in communication and computation.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1, showing a schematic illustration of the operation of bots, in accordance with some embodiments of the disclosure. For exemplary purposes, it may be predetermined that each bot may spawn up to two other bots for processing available data.

Bot_1 (161) is activated (or is pre-active). Bot_1 161 checks (111) and finds that data_block_1 151 is free for processing, and marks it as "under processing". Bot_1 161 checks (112) further and finds that additional data blocks are available for processing, and thus spawns (113, 115) bot_2 162 and bot_3 163. Bot_1 161 also starts processing data_block_1 151, including calling a relevant FaaS function. Bot_2 152 checks (121) and finds that data_block_2 152 is free for processing, marks it as "being processed" and starts processing. Bot_3 153 checks (131) and finds that data_block_3 153 is free for processing, marks it as "being processed" and starts processing.

Bot_2 152 further checks (122) and finds that data_block_4 154 is free for processing and spawns (123) bot_4 164 and bot_5 165. Bot_4 164 finds that data_block_4 154 is free for processing, marks it as "being processed" and starts processing, and bot_5 165 finds that data_block_5 155 is free for processing, marks it as "being processed" and starts processing. Bot_4 154 further checks (142) but does not find any further data for processing, and thus does not spawn any new bot, and similarly for bot_5 165.

Subject to any of the bots finishing processing successfully, it changes the mark of the data block it worked on into "handled". Subject to any of the bots finishing processing unsuccessfully, for example receiving an error message from the FaaS function or after a predetermined time has elapsed without a response being received from the FaaS function, the bot may determine, optionally in accordance with the type of error, whether to change the mark of the respective data block to an indication that another bot should try to process it, or to change it into "abandoned". The bot may then check whether it is the last existing bot, for example by checking a global variable, querying a common data source, or the like. If it is not the last executing bot, then it may exit. Otherwise, i.e., if it is the last remaining bot, it may change its mode of operation, and periodically check whether more data is available for processing. When data becomes available, it may resume the behavior described above.

Although not detailed above, each bot, prior to starting processing or spawning new bots may check for the availability of sufficient computing resources. Additionally, each bot may select the data block to process in accordance with a priority. The priority may be determined, for example as detailed below, in accordance with a function balancing the time indicated, for example by a human user, for the batch to start processing, and the priority of the data block, also referred to as urgency. The combination of indicated start time and priority ensures that lower priority tasks will eventually be processed, even if more urgent tasks arrive at a later time when the lower priority tasks have already been waiting for their turn.

It will be appreciated that the scenario described above may change, as bots operate in parallel, and each bot may also operate in multi-tasking, for example may first start processing and then spawning other bots, spawning one bot, starting processing and then spawning the other, or the like.

Thus, some of the actions described above may not occur, or occur in different order, other actions may occur, or the like.

Figure 2A:
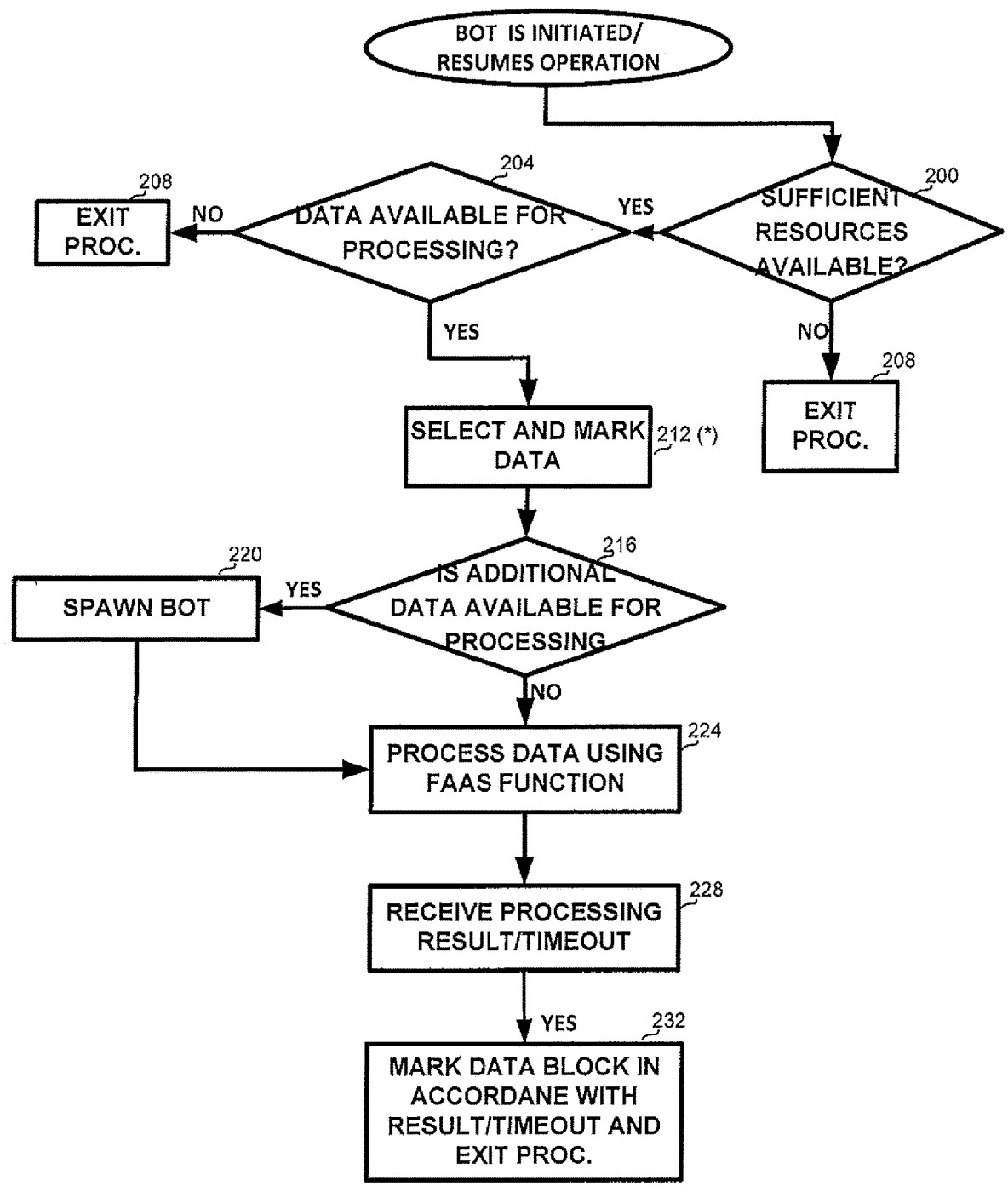
FIG. 2A is a flowchart of a method for data processing in serverless environment, in accordance with some embodiments of the disclosure.

Referring now to FIG. 2, showing a flowchart of a method for data processing in serverless environment, in accordance with some embodiments of the disclosure.

The method starts as a bot is initiated or resumes its operation. One bot may be initiated as the system starts for each type of task. As detailed below, the bot may spawn additional bots, which may continue spawning further bots. Each bot may terminate when finished its processing, unless it is the last remaining bot, in which case it changes its behavior until the circumstances change, as detailed above and below, and resumes its operation.

On step 200, the bot may determine whether sufficient resources exist for its processing. The resources may include CPU, memory, communication bandwidth, or the like. The resources may further include available external processing resources, for example that less than the maximal number of requests to an external processor, such as a FaaS processor are active.

If insufficient resources are available, the bot may proceed to step 208 in which it executes the exit procedure detailed in FIG. 2B below.

If sufficient resources are available, then on step 204 the bot may determine whether there is a data block to be processed. Each data block may have as part thereof, or on an associated memory space a mark indicating its status. The indications may include: not processed and not handled, being processed, handled, or abandoned. In addition, there may be one or more additional statuses indicating the number of processing attempts the data block has gone through. A maximal number of processing attempts may be determined, for example three. Then if processing of a data block by a bot failed with an error code that indicates that later processing may be successful (e.g. the problem is not in the data block itself), then the number of the processing attempts may be incremented and stored. When looking for a data block to process, a bot may thus determine whether there is a data block that is either not processed and not handled, or has undergone a number of processing attempts that is lower than the maximum.

If no such data block exists, then the bot may proceed to step 208 and perform the exit procedure.

If such data block exists, then on step 212 the bot may select a data block as detailed below, and mark it as "being processed", such that no other bot will attempt to process it. Selection may take into account the priority assigned to blocks.

On step 216 the bot may determine whether additional data is available for processing, e.g. whether there is a data block that is either free, or has undergone a number of processing attempts that is lower than the maximum.

If an additional data block exists, then on step 220 the bot may spawn another bot, which will start execution on step 200 as detailed above. Prior to spawning the new bot, the existing bot may check whether sufficient resources exist for the new bot, and spawn the new bot only subject to the existence of sufficient resources. However, the newly created bot will still check for resources on step 200, since the resource availability may have changed between the time the spawning bot checked for resources and the time the new bot is active. Changes in the resource availability may be due to other active bots, the operating system, other programs, hardware status, or the like.

On step 224, the bot may process the data block it marked, including calling a FaaS function executed for example on a cloud computing device.

On step 228, the bot may receive the processing result from the FaaS function. Alternatively, if a predetermined time has elapsed and no response was received from the FaaS function, a timeout may be fired.

On step 232, the bot may mark the data block in accordance with the received result or timeout.

If a successful result was received, the bot may mark the data block as handled, and may store the result or the data block as processed.

If a fail result, for example an error code, was received from the FaaS function, the bot may determine whether there is a chance that further processing may be helpful. For example, if the error code indicates a problem with the data block, there is no point in further processing attempts, and the data block may be marked as abandoned.

If, on the other hand the problem is due to insufficient resources or another failure of the FaaS function, or a timeout was fired, then the bot can determine that processing of the data block should be reattempted, and can mark the data block accordingly, e.g., increment the number or processing trials.

The bot can then perform the exit function.

In some embodiments, in order to avoid the data remaining marked as handled in case the bot itself failed before it changed the mark, the mark can expire, or be timed out, such that if not changed by the bot, it is reset automatically into "not processed and not handled".

Figure 2B:
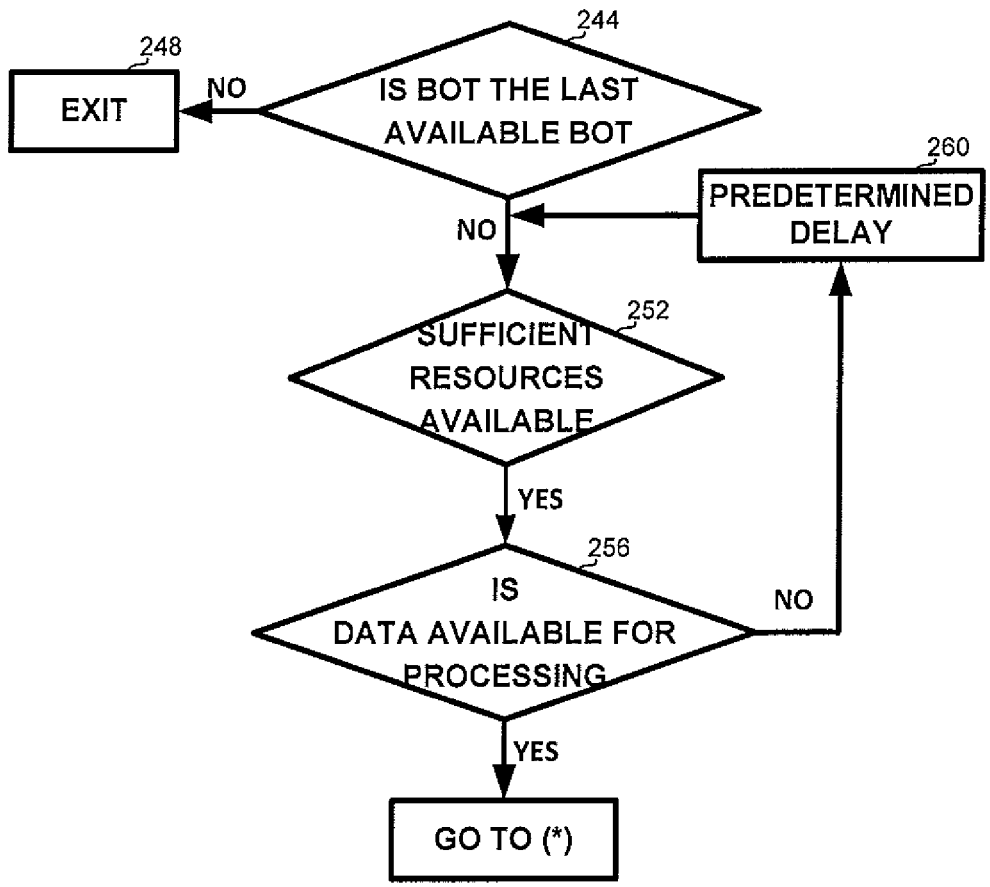
FIG. 2B is a flowchart of a bot exit procedure, in accordance with some embodiments of the disclosure.

Referring now to FIG. 2B, showing a flowchart of a bot exit procedure, in accordance with some embodiments of the disclosure.

On step 244, the bot may determine whether it is the last available bot. The number of bots can be stored in a data source, for example where the data to be processed is stored. The number can be increased when the bot is spawned, and decreased when it terminates. The number can be protected by a semaphore in order to avoid situations in which two or more last locks exit simultaneously.

If the bot is not the last bot, then the bot can exit and terminate on step 248.

If it is the last bot, then it can enter a different mode, in which it checks for resources and data to process. Thus, on step 252 it can check whether sufficient resources are available, similar to step 200 above.

If no sufficient resources are available, a predetermined delay may be waited on step 260, after which the resources are checked again.

If sufficient resources are available, then it may be determined on step 256 whether there is data available for processing, similar to step 204 above.

If data is available, then execution can return to step 212, to select and mark data. Otherwise the predetermined delay may be waited on step 260, after which the resources are checked again on step 244.

Figure 3:
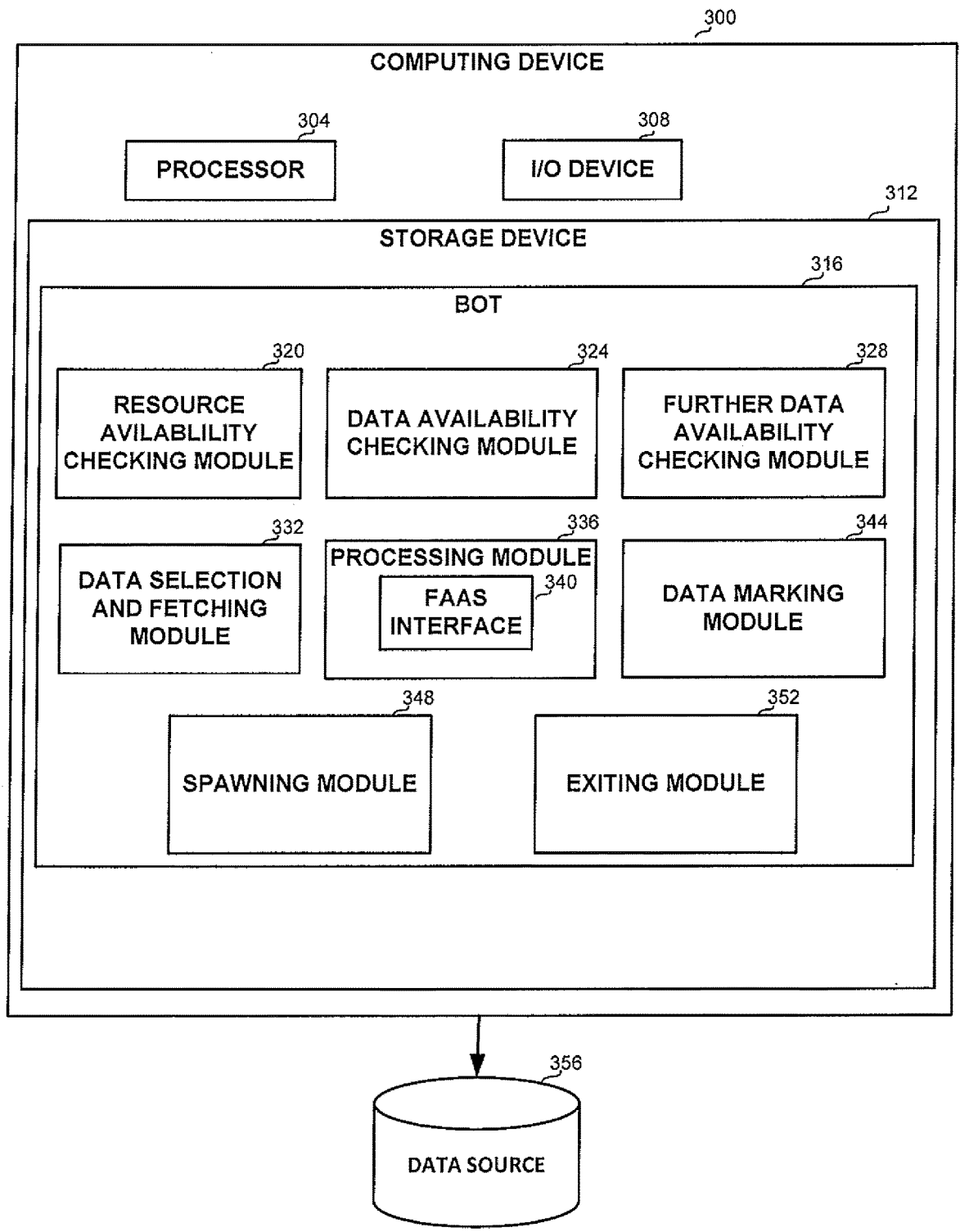
FIG. 3 is a block diagram of an apparatus for data processing in serverless environment, in accordance with some embodiments of the disclosure.

Referring now to FIG. 3, showing computing platform 300, configured to perform efficient data processing in serverless environment.

In some exemplary embodiments, computing platform 300 may comprise a processor 304, which may be a central processing unit (CPU), a microprocessor, an electronic circuit, an integrated circuit (IC) or the like. Processor 304 may be utilized to perform computations required by computing platform 300 or any of it subcomponents. Processor 304 may be configured to execute computer-programs useful in performing the method of FIGS. 2A and 2B.

In some exemplary embodiments, one or more I/O devices 308 may be configured to receive input from and provide output to a user. I/O devices 308 may comprise a keyboard, a pointing device such as a mouse or a touch screen, a display, or the like. In some exemplary embodiments, I/O devices 308 may be utilized to enable a user enter definitions, review results, or the like.

In some exemplary embodiments, a memory unit 312 associated with computing platform 300 may be a short-term storage device or long-term storage device. Memory Unit 312 may be a persistent storage or volatile storage. Memory unit 312 may be a disk drive, a Flash disk, a random access memory (RAM), a memory chip, or the like. In some exemplary embodiments, memory unit 312 may retain program code operative to cause processor 304 to perform acts associated with any of the subcomponents of computing platform 300. In some exemplary embodiments, memory unit 312 may retain program code operative to cause processor 304 to perform acts associated with any of the steps shown in FIGS. 2A and 2B above. The components detailed below may be implemented as one or more sets of interrelated computer instructions, executed for example by processor 304 or by another processor. The components may be arranged as one or more executable files, dynamic libraries, static libraries, methods, functions, services, or the like, programmed in any programming language and under any computing environment.

Memory unit 312 can store bot 316, wherein multiple instances of which can spawn each other and execute simultaneously.

Bot 316 can comprise resource availability checking module 320, for checking whether sufficient computing resources and FaaS resources are available for processing data.

Bot 316 can comprise data availability checking module 324, for checking whether there is data to be processed by a bot of the same type as the current bot, e.g., data blocks marked as "not processed and not handled", or data blocks which were attempted to be processed less than the allowed maximal number of times.

Bot 316 can comprise further data availability checking module 328, for checking whether there is further data available for processing, such that other bots can be spawned. In some embodiments, data availability checking module 328 and further data availability checking module 332 can be implemented as one component.

Bot 316 can comprise data selection and fetching module 332, for selecting a data block to be processed, and fetching the data such that it can be processed.

Bot 316 can comprise processing module 336, configured to process the fetched data block. Processing can include transmitting the data block or information related thereto to a FaaS function through FaaS interface 340. The FaaS function, also referred to as external function, can be executed by an external computing platform or facility, such as using cloud computing. However, the FaaS function can also be performed by the same or collocated computing platform as computing platform 300, using for example bookkeeping stored with the data.

Bot 316 can comprise data marking module 344 configured to change the mark of the data block according to its state, for example mark it as "being processed" when fetching it, mark as "processed" when processing is completed successfully, or the like.

Bot 316 can comprise spawning module 348 for spawning a new bot if sufficient resources are available and there exists data to be processed.

Bot 316 can comprise exiting module for checking whether the bot can terminate, as shown in FIG. 2B above.

All bots 316 can communicate with data source 356 which may be implemented on any one or more storage devices, and may contain data blocks to be processed, as well as processing results and further data, such as block mark.

As for selecting the data block to be processed, the following considerations can be taken into account:

FaaS usage can be limited by the "concurrency rate", i.e., the maximal number of concurrent calls that a function F is allowed to receive. When this number is reached the function throttles. Throttling behaviors can vary in practice, for example throttling can reject the execution of a further call.

FaaS processing can be viewed as a flow q, which is the number of the datablocks processed in a time unit. Accordingly, N data blocks may be processed in $$\text{time} = \frac{N}{q}.$$

The maximal flow q_max for a FaaS function F is constrained by the concurrency rate of the function. Accordingly, N data blocks may be processed by the function in the shortest time $$t_{min} = \frac{N}{q_{max}}.$$

T_min is considered to be the optimized processing time $\tau$ of the function F. The start and end time of processing may be defined as t_start and t_end, respectively. A pipeline Z may consist of L processing tasks, each executed using a different FaaS function Fi, each having an optimized time $\tau_i$, $z=\{F_1, \ldots F_i, F_{i+1} \ldots F_L\}$. Assuming no time delay between consecutive functions, $t_{i+1}^{start} = t_i^{end}$, the processing of the entire pipeline is then completed in the shortest time $$t_Z = \sum_{i=1}^{L} \tau_i.$$

A set S of m pipelines processed synchronously may be defined as $S=\{Z_1, \ldots, Z_{j+1} \ldots Z_m\}$. Processing the entire set may be completed in the shortest time $T_s = \max(T_{Z_1} \ldots T_{Z_m})$ under the following conditions:
1. Synchronous initiation, i.e., processing of the entire set starts at the same time; and
2. No scheduling conflicts, i.e., no two pipelines would call the same function F at the same time.

The latter condition rarely holds, for example it holds either when the batch jobs share no FaaS functions, or when execution is planned in advance and no function call conflicts occur. However, such planning is extremely complex and require elaborate statistics, as detailed above.

In an example, x and y are processing tasks belonging respectively to batch jobs X and Y, wherein x and y both execute function F. When a conflict occur between tasks x and y, the effect is the bottleneck $$T_{x,y} = \frac{N_x + N_y}{q}$$

wherein $N_x$ and $N_y$ are the numbers of task operations to be executed in each batch, respectively.

The delay for task x may be defined as $D_x = T_{x,y} - T_x$, and similarly for batch y: $D_y = T_{x,y} - T_y$. The total delay may be defined as a vector $D = \{Dx, Dy\}$. A cost C may be defined as the vector product $C = P*D$ where P stands for the vector of batch priorities. The priority may be defined as the degree of urgency to complete a batch job. Priority can be predetermined by a user, changed by a user or by an algorithm in accordance with the data processed within a time unit, or with the processing results, set in accordance with default values, or obtained in any other manner. The cost is thus a measure of the penalty incurred by delaying a pipeline job execution. This penalty may depend on the priority and the length of the delay.

It will be appreciated that the cost can vary according to the choice of the scheduling strategy. Two extreme scheduling methods, being Round Robin and Sequential Submission.

When using the Round Robin scheduling method, all conflicting jobs are delayed by the same degree. Every job needs to wait for all other jobs to complete, before it can process the next data block. Consider a case in which M jobs compete for function F with optimized processing time $T_F$ and assume that all M jobs need to process an identical number of data blocks, and that the processing time of all data blocks is constant t. In this situation, the delay $D_F$ at the function F becomes $D_F = (m-1)*\tau_F$, which sets the cost of the scheduling conflict at $$C_S = \sum_{i=1}^{M} (P | i * D_F).$$

When using the Sequential Submission scheduling method, all batch jobs except the first are delayed, and placed in a queue, until the first job completes processing. This is then repeated for each job in the queue in sequential order. The execution order can be random, first-in-first-out (FIFO), or if priorities are explicit, by using the priorities to order the queue. When following this strategy, the first job is not delayed at all, the second is delayed by the execution time of the first, the third is delayed by the execution time of the first two, and generalizing for the delay $D_Z$ of job Z that is in the position i in the queue for the function F is $D_{Z_i} = (i-1)*\tau_F$ assuming that execution times of all jobs are equal. The maximal delay is reached for the last job in the queue, where $i = m: D_{max} = (m-1)*\tau_F$. As shown above, this is equal to the delay at function F in the Round Robin strategy. The total delay, over all functions is also equal for both strategies.

Thus, when comparing the Round Robin and the Sequential Submission methods, both lead to the same execution time and the same overall delay. However, the cost may be significantly different. Assume that priority P is between $P_{min}$ and $P_{max}$, both positive, and that D is between $D_{min}$ and $D_{max}$, wherein $D_{min} \neq D_{max}$. Under these assumptions the following inequality holds:

$$\sum_{i=1}^{M}$$

This inequality holds even if the priorities are equal for all batch jobs, and the difference in this inequality depends on the priorities. Accordingly, in terms of cost, the sequential strategy is preferred, in particular given that the priorities are used for the ordering of queue (priority weighting).

Alternatively to constraining the usage of the FaaS functions by the number of concurrent calls, the usage can be constrained by a maximal number of concurrent calls for an entire user account, or alternatively for a user account on a particular server farm that provides FaaS services, which is useful in cases when the same account consumes FaaS services from multiple server farms. The processing time formula above can be generalized to refer to the overall system flow Q, and any number N of data blocks that need to be processed, which will be processed in time $$T = \frac{N}{Q},$$

whether N is divided into multiple pipelines, or whether Q is a flow constrained by overall concurrency constraints, or by a sum of individual function constraints. Accordingly, the following also holds:

$$T_{min} = \frac{N}{Q_{max}},$$

wherein Q_max is the capacity of the entire system.

When such constraint is imposed, the scheduling conflicts at the function level are elevated to the system level. The competition for a function occurs only when the total number of data blocks in all competing batch jobs exceeds the maximum system capacity Q_max. In such case not all jobs can be executed at once. This situation may create delays of individual pipeline jobs, which are not different than the delays detailed above. Consequently, the comparison between the scheduling strategies presented above are valid for this constraint, too.

However, the maximum system capacity Q_max can significantly affect the delay as well as the processing time. Assuming that the maximum system capacity is greater than the capacity of every individual FaaS function, a particular pipeline can be prioritized in such way that the maximum system capacity is allocated to all its functions. The effect of such preferred allocation is the shortening of the execution time $T_Z$. For example, processing 1,000 data blocks requires 10 calls to a function F having concurrent rate of 100, but only a single call to the same function, if the collective concurrent rate is 1,000. This does not only significantly shorten the processing time of that particular pipe job, but also lowers the delay for all other jobs in the queue.

Thus, given a constrained flow, the scheduling strategies affect neither the overall processing time, nor the overall delay in the case of scheduling conflicts. However, the different scheduling strategies may significantly affect the delays of individual pipelines. In the case that some pipelines are prioritized over others, some individual delays become significant, which may significantly affect the cost.

It will be appreciated that the overall processing time cannot be effectively measured where new pipeline jobs are coming in continuously, and where the synchronous initiation condition defined above is not realistic. A meaningful measure of the processing time is the time measured between the entry of a pipeline job into the queue, and the delivery of the processing results, being equal to the delay time plus the processing time. In such case the delay of individual jobs, and with it the choice of the scheduling strategy becomes highly relevant. The scheduling strategy is in particular relevant when the FaaS is collectively constrained. The collective constraint enables scheduling to prioritize a particular pipeline by assigning the capacity of the entire system to its functions, as detailed above. Such prioritization can not only eliminate the delay of a high priority job, but even significantly shorten its execution time.

As used herein, "about" or "approximately" shall generally mean within 20 percent, within 10 percent, and preferably within 5 percent of a given value or range. Numerical quantities given herein are approximate, meaning that the term "about" or "approximately" can be inferred if not expressly stated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for task execution, comprising:
   receiving a batch to be processed, the batch comprising a multiplicity of data blocks to be processed by a Function as a Service (FaaS); and
   scheduling initiation of a multiplicity of task executors, each task executor from the multiplicity of task executors configured to call the FaaS for processing a data block from the data blocks, the data block assigned to the task executor, such that exactly one FaaS call is made for processing each data block,
   wherein the FaaS is charged by a number of calls,
   wherein the FaaS is constrained by a maximal number of concurrent calls,
   wherein each task executor from the multiplicity of task executors spawns at most a predetermined number of task executors, subject to the existence of data available for processing by the task executors, in addition to availability of data to be processed by the task executor, and
   wherein the multiplicity of task executors are initiated to maximize an actual number of concurrent calls, thereby reducing a makespan of the batch.

2. A method for task execution, comprising:
   initiating a first task executor;
   determining by the first task executor whether sufficient resources are available for performing a task;
   detecting by the first task executor whether there is at least one data item from a batch upon which the task is to be executed, wherein the at least one data item is not being handled and not processed;

subject to the first task executor detecting the at least one data item:
- selecting by the first task executor a data item from the at least one data item; and
- marking by the first task executor the data item as being handled;

detecting by the first task executor whether there is at least one additional data item from the batch wherein the at least one additional data item is not being handled and not processed;

subject to the first task executor detecting the at least one additional data item, and determining that sufficient resources are available, initiating by the first task executor a second task executor configured as the first task executor;

processing by the first task executor the data item comprising calling an external function for processing, wherein usage of the external function is priced by a number of calls; and terminating the second task executor upon the existence of more than one task executor and any one of the following:
- receiving an indication that processing by the external function is completed, and marking the data item as processed;
- receiving an indication that processing by the external function failed, and marking the data item as not handled and not processed; or
- a predetermined time having passed since the data item was transmitted to the external function and marking the data item as not being handled and not processed.

3. The method of claim 2, wherein marking the data item as being handled expires subject to not being changed within a predetermined time, thereby making the data item available for processing.

4. The method of claim 2, wherein the external function is executed by an external computing device.

5. The method of claim 2, wherein selecting the data item from the at least one data item is performed in accordance with a combination of priority and importance assigned to each data item of the at least one data item.

6. The method of claim 2, wherein selecting the data item from the at least one data item comprises performing a round robin scheduling among the at least one data item.

7. The method of claim 2, wherein marking the data item comprises storing marks or states with the data item.

8. A system having a processor, the processor being adapted to perform the steps of
- initiating a first task executor;
- determining by the first task executor whether sufficient resources are available for performing a task;
- detecting by the first task executor whether there is at least one data item from a batch upon which the task is to be executed, wherein the at least one data item is not being handled and not processed;
- subject to the first task executor detecting the at least one data item:
  - selecting by the first task executor a data item from the at least one data item; and
  - marking by the first task executor the data item as being handled;
- detecting by the first task executor whether there is at least one additional data item from the batch wherein the at least one additional data item is not being handled and not processed;
- subject to the first task executor detecting the at least one additional data item, and determining that sufficient resources are available, initiating by the first task executor a second task executor configured as the first task executor;
- processing by the first task executor the data item comprising calling an external function for processing, wherein usage of the external function is priced by a number of calls; and
- terminating the second task executor upon the existence of more than one task executor and any one of the following:
  - receiving an indication that processing by the external function is completed, and marking the data item as processed;
  - receiving an indication that processing by the external function failed and marking, the data item as not handled and not processed; or
  - a predetermined time having passed since the data item was transmitted to the external function and marking the data item as not being handled and not processed.

9. The system of claim 8, wherein marking the data item as being handled expires subject to not being changed within a predetermined time, thereby making the data item available for processing.

10. The system of claim 8, wherein the external function is executed by an external computing device.

11. The apparatus of claim 8, wherein selecting the data item from the at least one data item is performed in accordance with a combination of priority and importance assigned to each data item of the at least one data item.

12. The system of claim 8, wherein selecting the data item from the at least one data item comprises performing a round robin scheduling among the at least one data item.

13. The system of claim 8, wherein marking the data item comprises storing marks or states with the data item.

14. A computer program product comprising a non-transitory computer readable medium retaining program instructions, which instructions when read by a processor, cause the processor to perform a method comprising:
- initiating a first task executor;
- determining by the first task executor whether sufficient resources are available for performing a task;
- detecting by the first task executor whether there is at least one data item from a batch upon which the task is to be executed, wherein the at least one data item is not being handled and not processed;
- subject to the first task executor detecting the at least one data item:
  - selecting by the first task executor a data item from the at least one data item; and
  - marking by the first task executor the data item as being handled;
- detecting by the first task executor whether there is at least one additional data item from the batch wherein the at least one additional data item is not being handled and not processed;
- subject to the first task executor detecting the at least one data item, and determining that sufficient resources are available, initiating a second task executor configured as the first task executor;
- processing by the first task executor the data item comprising calling an external function for processing, wherein usage of the external function is priced by a number of calls; and terminating the second task executor upon the existence of more than one task executor and any one of the following:
   receiving an indication that processing by the external function is completed, and marking the data item as processed;
   receiving an indication that processing by the external function failed, and marking the data item as not handled and not processed; or
   a predetermined time having passed since the data item was transmitted to the external function and marking the data item as not being handled and not processed.

\* \* \* \* \*